United States Patent [19]

Court et al.

[11] Patent Number: 5,078,414
[45] Date of Patent: Jan. 7, 1992

[54] TROLLEY

[75] Inventors: Michael A. O. Court, London; David R. Betts, Kent, both of England

[73] Assignee: Kentinental Engineering Limited, Kent, England

[21] Appl. No.: 486,451

[22] Filed: Feb. 28, 1990

[30] Foreign Application Priority Data

Mar. 7, 1989 [GB] United Kingdom ............... 8905127

[51] Int. Cl.⁵ .............................................. B62B 3/02
[52] U.S. Cl. ........................................ 280/42; 108/50; 280/47.35; 280/651; 280/659
[58] Field of Search .................. 280/47.35, 47.19, 42, 280/651, 659; 108/23, 50

[56] References Cited

U.S. PATENT DOCUMENTS

| D. 170,692 | 10/1953 | Jacoby | 280/47.35 |
|---|---|---|---|
| 2,299,008 | 10/1942 | De Lisle | 248/285 |
| 2,830,825 | 4/1958 | Webber et al. | 280/659 |
| 3,863,985 | 2/1975 | Zuber | 298/2 |
| 4,523,768 | 6/1985 | Dlubala | 280/42 |
| 4,542,909 | 9/1985 | Littwin et al. | 280/47.35 |
| 4,549,748 | 10/1985 | Haley, Sr. | 280/641 |
| 4,690,417 | 9/1987 | Betts et al. | 280/42 |

FOREIGN PATENT DOCUMENTS

| 152318 | 4/1932 | Switzerland | 411/348 |
|---|---|---|---|
| 323921 | 1/1929 | United Kingdom . | |
| 933546 | 8/1963 | United Kingdom . | |
| 1133057 | 11/1968 | United Kingdom | 280/42 |
| 2189197 | 10/1987 | United Kingdom . | |

Primary Examiner—Andres Kashnikow
Assistant Examiner—Eric Culbreth
Attorney, Agent, or Firm—Blum Kaplan

[57] ABSTRACT

The invention concerns a foldable trolley for supporting apparatus such as computers, photocopiers or other office of medical equipment while being serviced.

A foldable trolley has a base having two sides each having at a top thereof a support member, connecting members connecting the sides so that they can be moved towards and away from one another, wheel members on which the trolley base is mounted, and a detachable trolley top adapted in a horizontal working position to bridge and be supported on the support members when the trolley sides are spaced apart, and in a storage position to be suspended at one side of the folded trolley base. The top has disengageable engagement members for engaging with the support members to retain it in its working position, and the engagement members and support members are engageable and disengageable from one another by a combination of relative sideways translational movement with the top at an acute angle to the horizontal and rotational movement between that angled position and a horizontal position.

21 Claims, 5 Drawing Sheets

TROLLEY

This invention relates to a trolley particularly intended for supporting articles, for example computers, photocopiers, televisions, or medical and test equipment in a convenient manner for maintenance or service work to be performed easily thereon.

An object of the invention is to provide a support surface which is convenient for supporting objects for work to be done thereon, is convenient for moving the objects, for example between the delivery area and the workshop area, and yet can be folded away when not required.

Our British Patent Specification No: 2189197 describes a foldable trolley having a detachable top but this trolley is not particularly suitable as a maintenance trolley. The top is removed from the base by a forwards translational movement of rollers on rails. The top is not stored on the folded trolley when they are not in use.

U.S. Specification No 4523768 discloses a cart in which the sides can move together to fold the trolley base and which has a tray which, while normally supported at the bottom for load bearing, can be supported at the top. However, it is not then suitably supported for carrying substantial loads. The attachment of the tray to the trolley base is awkward to operate. The tray is stored between the sides when not in use which restricts the position of the connecting struts to the ends of the base.

G.B. Specification 933546 shows a folding trolley with a detachable top but the sides do not move together to fold the trolley so the top is not supported on support members of the sides. The top is engaged with the base by a frontwards translational movement only.

U.S. Specification 4549748 shows a foldable frame for supporting a bag for rubbish. This frame has a lid which can be moved upwardly and sideways but is not capable of supporting a load as required for a maintenance trolley.

U.S. Specification 3863985 shows a trolley having a tray which can be tilted forwards to dispose of the contents.

In one aspect, this invention provides a trolley comprising a foldable trolley base having two sides each having at a top thereof a support member, means connecting the sides so that they can be moved towards and away from one another, wheel means on which the trolley base is mounted, a detachable trolley top adapted in a horizontal working position to bridge and be supported on the support members when the trolley sides are spaced apart, the top having disengageable engagement means for engaging with the support members to retain it in this working position, and the engagement means and support member being engageable and disengageable from one another by a combination of relative sideways translational movement with the top at an acute angle to the horizontal and rotational movement between that angled position and a horizontal position.

In one preferred form the trolley comprises a foldable trolley base having a pair of substantially upright sides, means connecting the sides so that they can be moved between a folded condition adjacent one another and a working position spaced from one another, wheel members on which the sides are mounted, the sides respectively having substantially horizontally extending first and second support members, a detachable top having sides, ends, a top surface and a bottom surface, first and second engagement members mounted on and projecting downwardly from the bottom surface of the top, the engagement members being adapted to engage respectively with the support members of respective sides whereby the top is supported on and bridges the support members in a working position thereof in which the top surface provides a weight bearing support surface of the trolley;

one of the first engagement member and first support member defining a sidewardly opening channel adapted to receive the other of such members by a substantially sideways translational movement of the top relative to the base, the top being rotatable about the first support member when so engaged with the first engagement member, one of the second engagement member and the second support member defining a substantially vertically opening channel adapted to receive the other of such members following such a rotational movement of the top about the first support member; and the support members and engagement members being such that when the engagement members are engaged with respective ones of the support members the top is restrained against horizontal or vertical movement relative to the base.

When the trolley is not required, the top can be removed and supported on the folded base at one side thereof in a substantially vertical orientation, preferably by suspending it from one support member by hook members or the like. This provides convenient storage.

A releaseable, spring loaded, catch means is preferably provided to engage the engagement member and support member at at least one side, in the working position.

Preferably each support member comprises a central portion of non circular cross section, preferably square, and ends which are of circular cross section. This provides good support while accomodating the rotational movement of the top.

Preferably the trolley has cable connection means for connecting it to a power supply and then has a plurality of sockets supplied via such a connection means. Thus, any object on the trolley which requires a power supply can be plugged into such a socket and does not involve a separate lead trailing over the ground.

In another aspect the invention provides a trolley comprising a foldable trolley base having sides, each side having a substantially horizontally extending base member and an upright frame member extending upwardly from a central portion of the base member and ending in an upper support member, means connecting the sides so that they can be moved towards and away from one another, wheel means on which the trolley base is mounted, a detachable trolley top adapted in a horizontal working position to bridge and be supported on the support members of the sides when spaced apart, and a C shaped base platform adapted to bridge and be supported on the base members, the C shaped platform defining a cut-out portion to accommodate the upright frame portions of the sides. The base platform is usable for example to store parts taken from the machine being serviced. This base platform may include an adjustable angle plate to facilitate the safe stowage of a flat glass platen. Such a base platform, is preferably shaped to fit around the vertical side frames of the trolley base and includes means for suspending it, in a substantially vertical orientation, from the other side of the trolley in the folded condition. In this stowed position of the folded trolley the opening between the arms of the 'C' will still expose the power supply panel.

Preferably, the trolley includes one or more attachable and detachable trays suitable for holding tools, pieces removed from the object being serviced or other items. Such trays preferably clip on to or plug into the sides of the top.

As an optional extra the trolley includes a lamp, preferably with a flexible arm, which will plug into one of the sockets and has means for attachment to the trolley top. In a preferred form, the trolley top has sides made up from hollow tube and the lamp is mounted on a tube or bar designed to be a sliding fit in the end of such tube so that it can be mounted at any of the corners of the trolley and detachably retained therein possibly with a retaining means.

In another aspect the invention provides a trolley comprising a foldable trolley base having sides, each side having a substantially horizontally extending base member and an upright frame member supporting at a top thereof a horizontal support member, means connecting the sides so that they can be moved towards and away from one another between a working position in which they are spaced apart and a folded condition in which they are adjacent one another, wheel means on which the trolley base is mounted, a detachable trolley top adapted in a horizontal working position to bridge and be supported on the support members of the sides when spaced apart, each of the base members having a central portion at least as long as the upright frame member which extends upwardly therefrom and outwardly flared end portions, and wheel mounting means mounting one of the wheel means adjacent an end of each outwardly flared portion. Preferably the wheel means are in the form of lockable easy glide castors. The flaring gives the trolley greater stability and allows the castors to be spaced from one another in the folded condition of the trolley sufficiently for them to adopt any angle so that the folded trolley can still be easily moved around and maneuvered in any direction on the castors.

In another aspect the invention provides a maintenance trolley comprising a foldable trolley base mounted on wheel means, a detachable trolley top having attachment means for mounting it on the unfolded trolley base in a horizontal disposition, and adapted to be supported on and at one side of the folded trolley base in a vertical disposition, the trolley being movable on the the wheel means in both its folded and unfolded conditions.

One embodiment of trolley in accordance with the invention will now be described by way of example only, with reference to the accompanying drawings of which.

Figure 1:
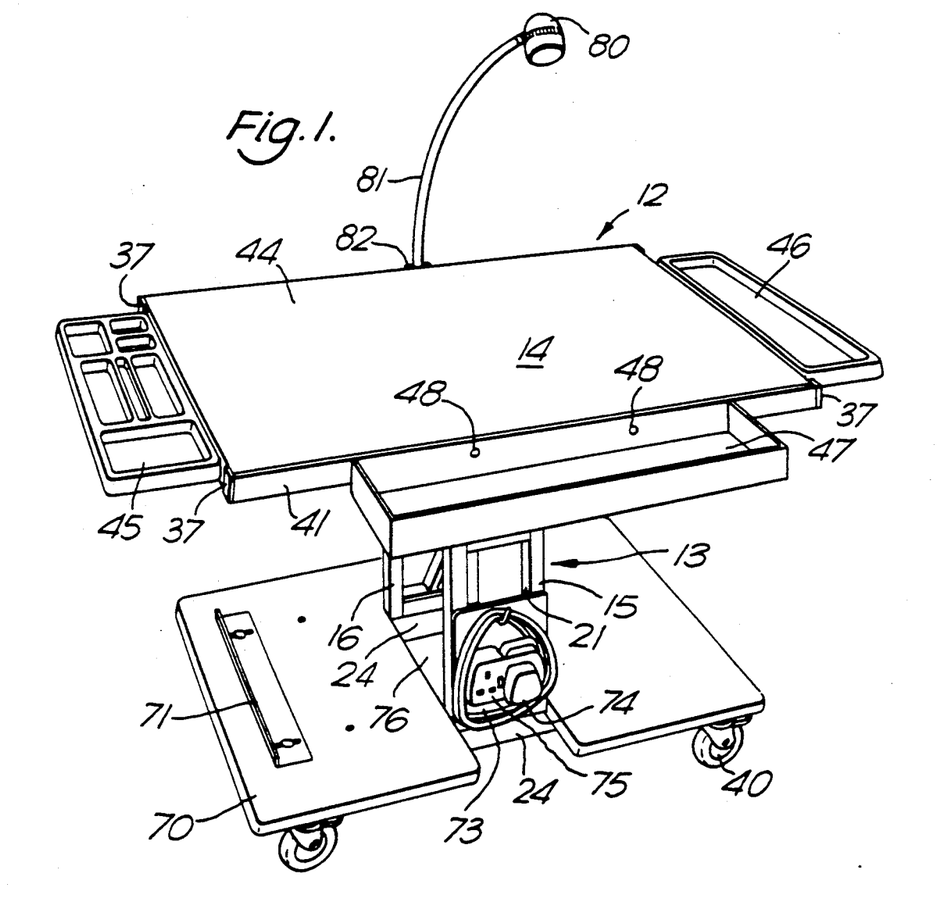
FIG. 1 is a perspective view of a maintenance trolley in its working condition.
Figure 2:
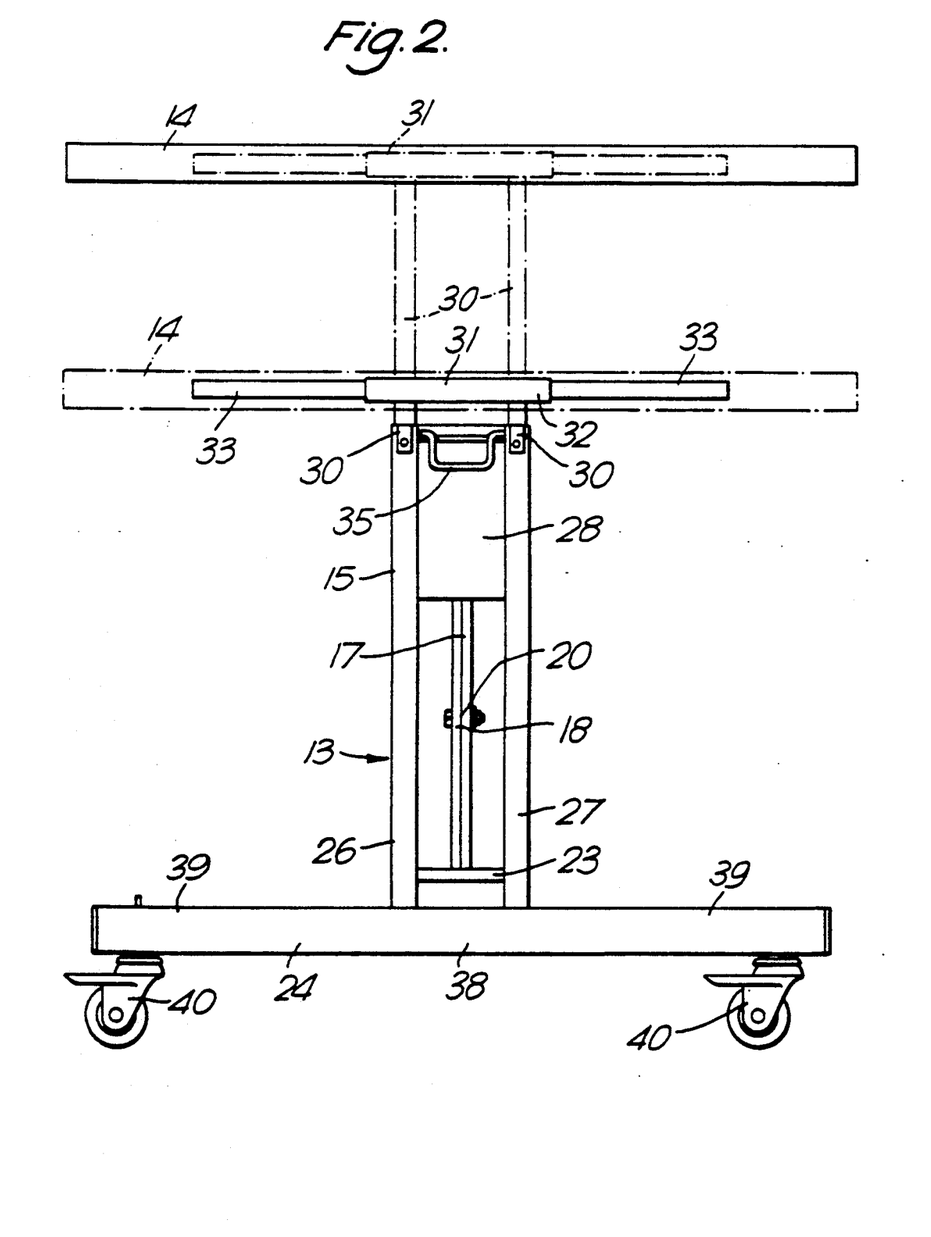
FIG. 2 is a side view of the trolley of FIG. 1 in its working condition.
Figure 3:
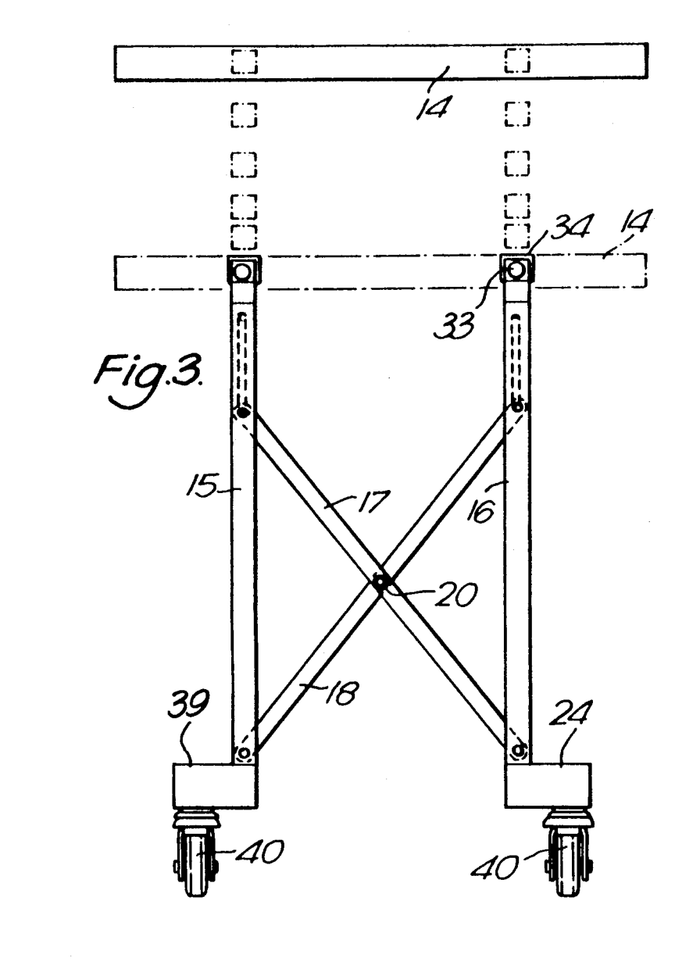
FIG. 3 is an end view of the trolley of FIG. 1 in its working condition.

The trolley 12 comprises a base 13 and a detachable top 14. The base 13 has two sides 15, 16 each side comprising a horizontal base tube 24 and a vertical side frame 21. The sides 15, 16 are connected by tubes 17, 18 pivotally connected at their central portions 20 and each connected at its lower end to a cross tube 23 pivotally mounted in one of the frames 21, and at its upper end being connected to a cross bar slidable vertically in the other of the frames 21. This allows the sides to be pushed towards one another to a folded condition in which they are substantially adjacent one another or pulled away from one another to a working spaced position, as described more fully in the above mentioned G.B. Specification 2189197.

Each side frame 21 has a lower section comprising spaced, vertical, square sectioned tubes 26, 27 welded to base tube 24 and connected by a panel 28, and an upper shaped section comprising vertical square sectioned tubes 30 designed to be telescopically slidable in the tubes 26, 27 and a horizontal support member 31. The support member 31 comprises a central rectangular, preferably square, sectioned tube 32 in which is secured a longer round sectioned tube 33 so that the ends of the support member are both round sectioned. The central portion has a greater height than the end sections by the thickness of the tube 32.

Figure 8:
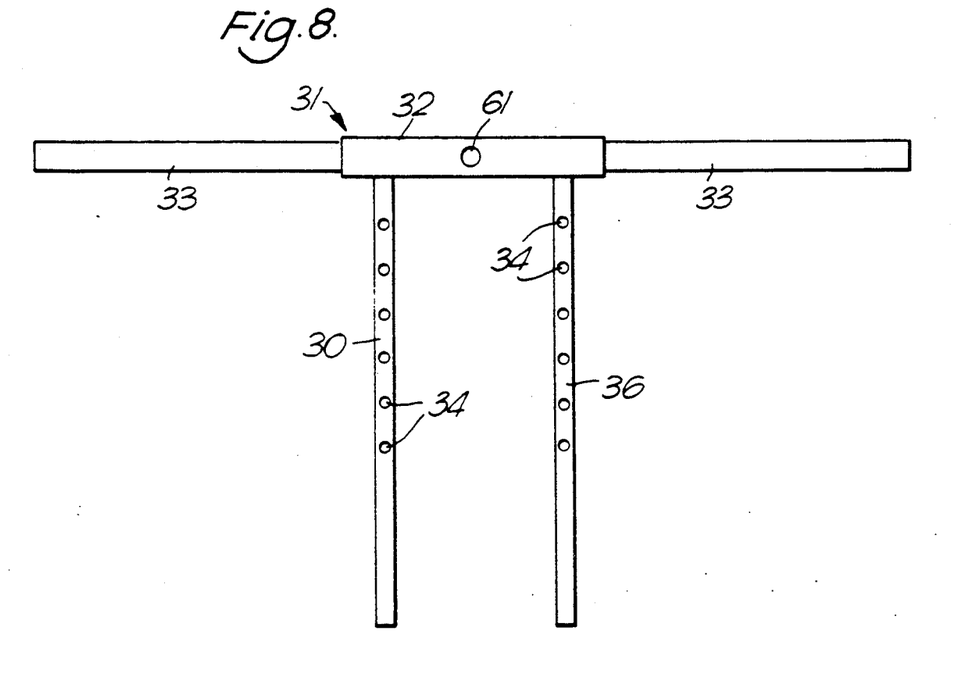
FIG. 8 is a side view, on an enlarged scale, of the upper support bar of one side of the trolley.

The tubes 30 (FIG. 8) are formed with a series of holes 34 for receiving spring loaded pins, not seen, mounted in the lower section of each side frame 21. The pins are retractable by a common operating handle 35, as described more fully in the above mentioned G.B. Specification 2189197 so that the height of the support member 31 at each side of the trolley can be adjusted to a convenient working height for the particular object mounted on the trolley to be worked on. While this describes a manually adjustable system the trolley may be provided with a mechanically operated system for example with a screw jack and bevel gears as described in the above mentioned Specification. The height adjustment is preferably in the range 200 to 300 millimetres.

Figure 4:
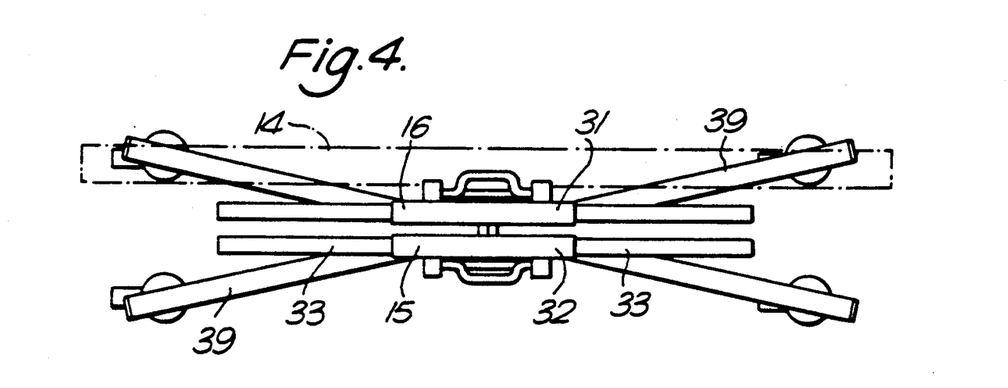
FIG. 4 is a plan view of the trolley in its folded position.

Each base tube 24 has a central straight part 38 to which the side frame 21 is secured and which has a length at least as long as that side frame, and outwardly flared end parts 39 of lengths greater than the length of the central part, adjacent the ends of which end parts are mounted lockable easy glide castors 40. The flaring is preferably in the range 5°–15°, with advantage substantially 10°, but is such that when the two sides are adjacent one another in the folded position the castors will still be free to move in any direction so that the trolley, even in the folded condition, is easily moved and maneuvered in any direction. The flaring also provides for greater stability of the trolley in its working position. As seen in FIG. 4, in the folded condition of the trolley base, the distance between the centers of the wheel means on opposite sides of the trolley base is at least twice as great as the width of the trolley base at the central parts 38, and the top 14 is suspended over the wheel means at one side of the trolley base.

The trolley top 14 (FIG. 6) is made up from a framework of spaced side tubes 41, intermediate tubes 43, and end tubes 42 and a planar support platform 44. Each end of the side tubes 41 is closed by a detachable end plug 37 of a pleasing appearance. The upper support surface 44 preferably has a non slip, anti-static finish or is provided with a non slip, anti-static slip mat. The wheels may also be made anti-static, and the trolley may be sold in combination with an anti-static personnel cuff. The top may be manufactured in more than one size to fit on the same trolley base. The trolley may include a plurality of trays, in this example a divided tool tray 45, a plain shallow tray 46 and a deep trough tray 47. Each of these trays is preferably made in molded plastics with a wire frame and each has pin connection means indicated at 48 extending from one side adapted to push into co-operating socket means 49 along the outer sides of the tubes 41 and 42 of the top. Any other inter-fitting detachable attachment means could be used for supporting the trays from the top.

Figure 6:
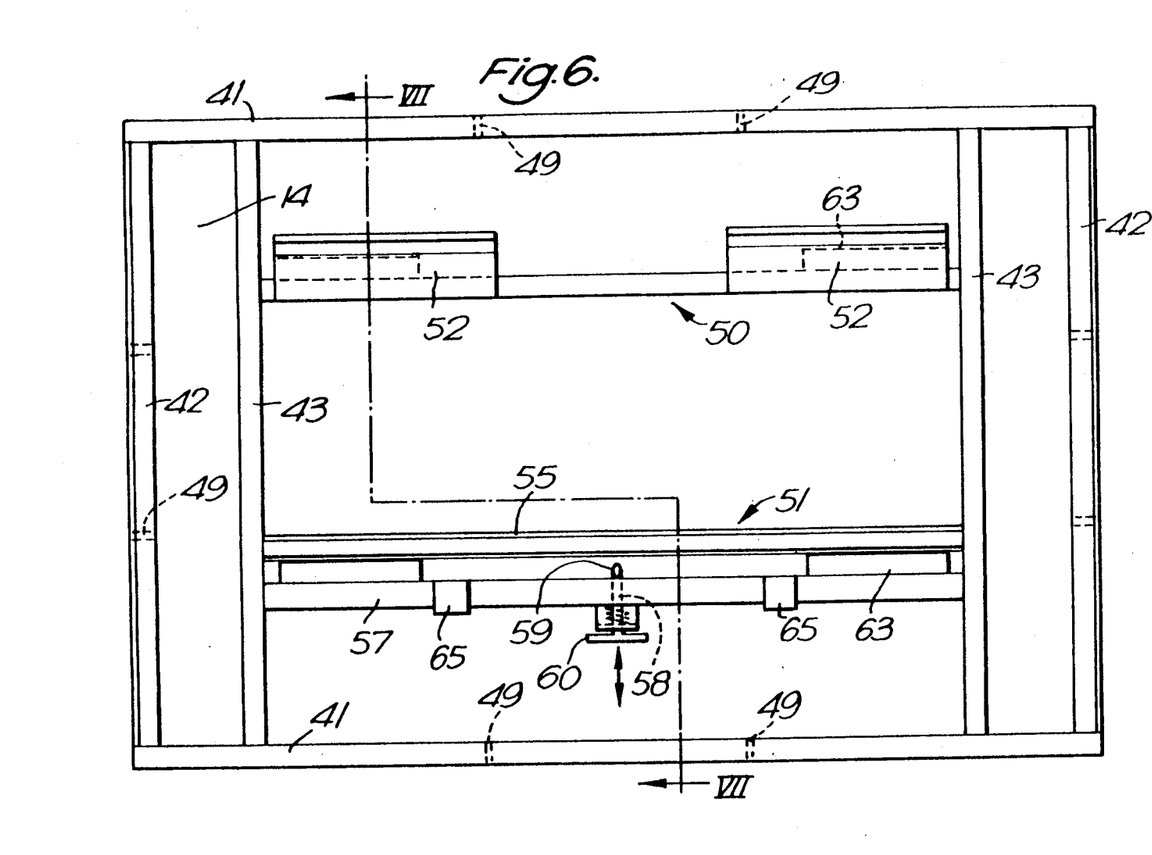
FIG. 6 is an underneath plan view of the trolley top.
Figure 7:
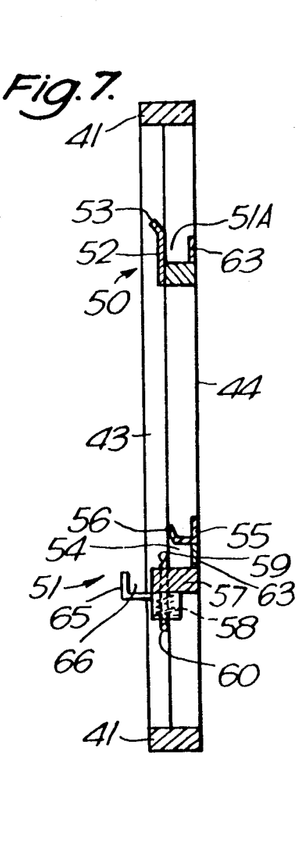
FIG. 7 is a section on the Line VII—VII of FIG. 6.

As can be seen in FIGS. 6 and 7, the underside of the top 14 is provided with a pair of spaced engagement members 50, 51 designed to engage respectively with the support members 31 of the sides of the trolley base. The support member 50 defines two aligned sidewardly and outwardly facing horizontally extending channels 51A (only one being seen in FIG. 7 with the other adjacent the other end of the top 14) designed to receive the round sectioned ends of one support member 31, these channels being defined by angle-sectioned brackets 52 each having an outwardly flared lip 53 and being connected to and depending downwards from the underside (bottom surface) of the platform 44. The engagement means 51 comprises a downwardly opening horizontally extending channel 54 defined between a first elongate section 55 having an outwardly flared lip 56 and a second elongate section 57. Section 57 mounts a spring loaded pin 58 having a sloped lower surface 59 and connected to a handle 60.

In order to engage the top 14 with the support members 31, the top is first placed above the trolley in its working position at an acute angle to the horizontal e.g. 10° and the top is moved horizontally into a position such that the rounded ends 33 of one support member 31 engage in the channels 51A, and the top is then rotated downwardly about these rounded ends 31 until the other support member 31 locates in the channel 54. The outer side of the square sectioned portion 32 of each support member 31 is provided with a hole 61 and as the portion 32 is pushed into the channel 54 it acts against the sloped face 59 of the pin 58 causing it to retract until it is opposite the hole 61 when it will engage in the hole 61 to restrain the top in this supported position. This provides an automatically acting, spring loaded, catch means. By pulling handle 60 the pin can be released from hole 61 allowing the top to be pivoted upwardly and then withdrawn towards the operator to disengage the members 31 from the channels 51A so that the top can be lifted off. Four strips 63 are in the channels 54 and 51A, having a thickness equal to the difference in radius between the tubes 32 and 33 so that as the square sectioned portions 32 engage the underside of the support surface 44 the round sectioned portions 33 will engage the strips 63.

Sidewardly and upwardly opening channels could be provided in the support members 31, with the engagement means on the top locating in such channels.

Figure 5:
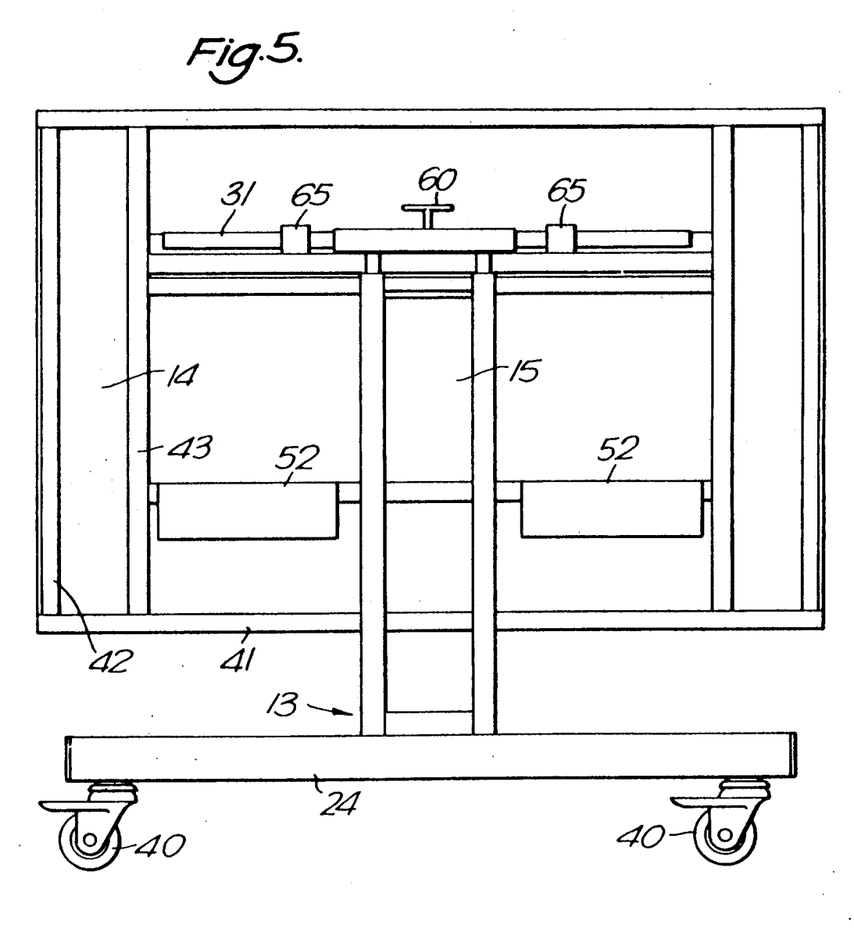
FIG. 5 is a side view of the trolley in its folded folded position with some parts omitted for clarity.

The underside of the top is further provided with a pair of angle-sectioned hook members 65 defining a sidewardly opening channel 66. As seen in FIG. 5 when the top has been removed and the trolley base collapsed, the side can be suspended by these hook members 65 from the support member 31 at one side of the trolley. Alternatively members 65 can be near one side edge 41 of the top so that when supported by hooks 65 the other side edge rests on or is adjacent a base tube 24.

The trolley is further provided with a substantially planar, C-sectioned base platform 70 (FIG. 1) which is useful for storing large parts taken from a machine being serviced. In its working position this platform bridges and is supported on the base tubes 24. This platform includes an adjustable angle plate 71 to facilitate the safe stowage of a flat glass platen. One side of the trolley also mounts a multi-socket power take-off panel 73 having connecting means 74 for connecting it to a power supply and preferably having four sockets 75 for receiving the plugs of apparatus mounted on the trolley. This power panel may include a power surge protection device. The base platform 70 has a channel/cut out 76 between the arms of the 'C' and in the working position shown in FIG. 1 this accommodates the upright portions of the sides while the platform is supported on the base tubes 24. This platform is also detachable from the trolley base and is provided with hook-shaped members, not seen, similar to members 65 so that it can be supported from the support member 31 at the opposite side of the trolley from the trolley top. In this position the channel 76 leaves exposed the power take-off panel. Fastening means may be provided for securing the platform 70 to the trolley base in the working position.

Figure 9:
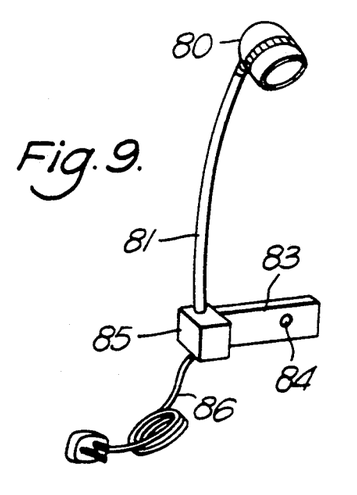
FIG. 9 is a diagramatic sketch of an alternative form of lamp mounting.

As seen in FIG. 1, a lamp 80 mounted on a flexible arm 81 is attachable to one side of the trolley at 82. This lamp will be plugged into one of the sockets on the power take-off panel. As seen in FIG. 9, as an alternative mounting, the lamp is mounted on an elongate member 83 adapted to be a sliding fit in one end of one of the tubes 41. Any one of the plugs 37 can be selectively removed and the lamp mounted in its place at a selected corner of the trolley. The member 83 may include a spring loaded detent button 84 and the side 41 an aperture in which the button can engage when the lamp is mounted therein. The lamp mounting may include a transformer 85 and electrical connecting lead 86.

What is claimed is:

1. A trolley comprising a foldable trolley base having two sides each having at a top thereof a support member, means connecting the sides so that they can be moved towards and away from one another, wheel means on which the trolley base is mounted, a detachable trolley top adapted in a horizontal working position to bridge and be supported on the support members when the trolley sides are spaced apart, the top having disengageable engagement means for engaging with the support members to retain it in its working position, and in which at least one of the support members comprises a central portion of rectangular cross section and end portions of circular cross section.

2. A trolley comprising a foldable trolley base having a pair of substantially upright sides, means connecting the sides so that they can be moved between a folded condition adjacent one another and a working position spaced from one another, wheel members on which the sides are mounted, the sides respectively having substantially horizontally extending first and second support members, a detachable top having sides, ends, a top surface and a bottom surface, first and second engagement members mounted on and projecting downwardly from the bottom surface of the top, the engagement members being adapted to engage respectively with the support members of respective sides whereby the top is supported on and bridges the support members in a working position thereof in which the top surface provides a weight bearing support surface of the trolley;

one of the first engagement member and first support member defining a sidewardly opening channel adapted to receive the other of the first engagement member and the first support member by a substantially sideways translational movement of the top relative to the base, the top being rotatable about the first support member when so engaged with the first engagement member, one of the second engagement and the second support member defining a substantially vertically opening channel adapted to receive the other of the second engagement member and the second support member following such a rotational movement of the top about the first support member;

the support members and engagement members serving when engaged together to restrain the top against horizontal and vertical movement relative to the base.

3. The trolley according to claim 2 including releasable retaining means for retaining the top in its working position against rotation about a horizontal axis relative to the base.

4. The trolley according to claim 2 in which at least one of the support members comprises a central portion of rectangular cross section and end portions of circular cross section and in which the central portion of the support member is of greater height than the end portions, and including insert members having a thickness substantially equal to the difference in height between the central portion and the end portions, the insert members being located in the channels in the engagement members to contact the end portions when engaged in said channels so that the top is supported both on the central portion and the end portions of each support member in its working position.

5. The trolley according to claim 2 including a detachable base platform and base support means adapted to support the base platform below the top and bridging the sides of the trolley base in its working condition.

6. The trolley according to claim 2 including a power supply panel having a plurality of sockets mounted on the base and a connecting cable means for connecting the sockets to a power supply.

7. The trolley according to claim 2, in which the trolley base includes a power supply panel and further including a detachable base platform and base support means adapted to support the base platform below the top and bridging the sides of the trolley base in its working condition in which the base platform is C shaped defining a cut out portion to fit around the upright side frame portions of the trolley base, in which the base platform includes hook means adapted to suspend the base platform from the trolley base when folded such that the cut out is aligned with and exposes the power supply panel.

8. The trolley according to claim 2 in which the top has side edges and includes attachment means for attaching it in a substantially vertical orientation outside one side of the folded trolley base and with the side edges above the wheel means at said one side.

9. The trolley according to claim 8 in which the attachment means includes hook means projecting from the bottom surface of the trolley top, the hook means being adapted to engage over support means of one side of the folded trolley base.

10. The trolley according to claim 8, in which the trolley base includes a power supply panel and further including a detachable base platform and base support means adapted to support the base platform below the top and bridging the sides of the trolley base in its working condition in which the base platform is C shaped defining a cut out portion to fit around the upright side frame portions of the trolley base, in which the base platform includes attachment means adapted to suspend the base platform from the trolley base when folded such that the cut out is aligned with and exposes the power supply panel.

11. The trolley according to claim 2 or 4 including releasable spring loaded catch means adapted to automatically engage a support member at one side of the trolley as that support member engages with one of the engagement members of the top.

12. The trolley according to claim 2 or 4 including a detachable base platform and base support means for supporting the base platform below the top and bridging the sides of the trolley base in its working position and in which the base platform includes an adjustable angle plate adapted to facilitate the safe stowage of a flat glass platen.

13. The trolley according to claim 2 or claim 4 including a detachable base platform and base support means adapted to support the base platform below the top and bridging the sides of the trolley base in its working condition in which the base platform is C shaped defining a cut out portion to fit around upright side frame portions of the trolley base.

14. The trolley according to claim 2 or 8 in which each side has a horizontally extending base member and an upright frame member, and each of the base members has a central portion at least as long as the upright frame member which extends upwardly therefrom and outwardly flared end portions, and wheel mounting means mounting one of the wheel means adjacent an end of each outwardly flared portion.

15. A trolley comprising a foldable trolley base having sides, each side having a substantially horizontally extending base member and an upright frame member extending upwardly from a central portion only of the base member and ending in an upper support member, means connecting the sides so that they can be moved towards and away from one another, wheel means on which the trolley base is mounted, a detachable trolley top adapted in a horizontal working position to bridge and be supported on the support members of the sides when spaced apart, and a C shaped base platform adapted to bridge and be supported on the base members, the C shaped platform defining a cut-out portion to accommodate the upright frame portions of the sides.

16. The trolley according to claim 15 in which the trolley base includes a power supply panel and the base platform includes hook means adapted to suspend the platform from the trolley as when folded such that the cut-out is aligned with and exposes the power supply panel.

17. The trolley according to claim 15, 2 or 4 in which at least one of the support members comprises a central portion of rectangular cross section and end portions of circular cross section.

18. The trolley according to any of claims 2, 4 and 15 including a plurality of trays, the trolley top and trays having inter-fitting detachable attachment means for supporting the trays from the top.

19. The trolley according to any of claims 15, 2 or 4 in which the trolley top has sides formed from hollow tubes having ends, removable plug means for closing said tube ends, and a lamp mounted on an elongate member which is a sliding fit in any of the tube ends so that it can be inserted in such tube end to mount the lamp at a corner of the trolley.

20. A trolley comprising a foldable trolley base having upright sides, means connecting the sides so that they can be moved towards and away from one another, wheel means on which the trolley base is mounted, a detachable trolley top adapted to bridge and be supported on the sides when they are spaced apart in a working position so as to form a load bearing top for the trolley, the top having sides formed from hollow tubes having ends, removable plug means for closing said tube ends and a lamp mounted on an elongate member which is a sliding fit in an end of a side tube so that the lamp can be mounted at any corner of the trolley detachably retained in the tube end.

21. The trolley according to claim 20 including a plurality of trays, the trolley top and trays having interfitting detachable attachment means for supporting the trays from the top.

* * * * *